W. D. FARRELL.
HOG GRAPPLE AND CONVEYER.
APPLICATION FILED MAY 15, 1908.
No. 899,391.
Patented Sept. 22, 1908.
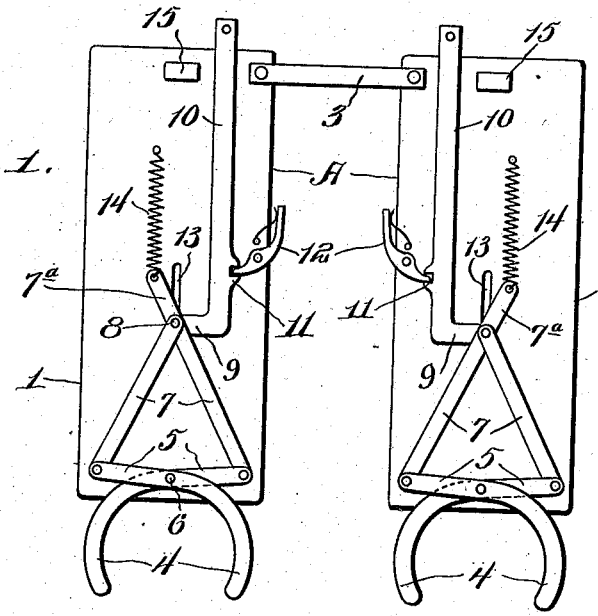
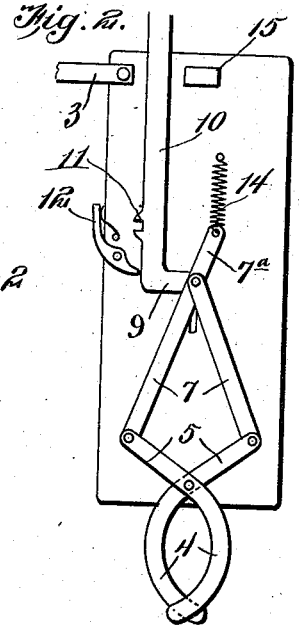
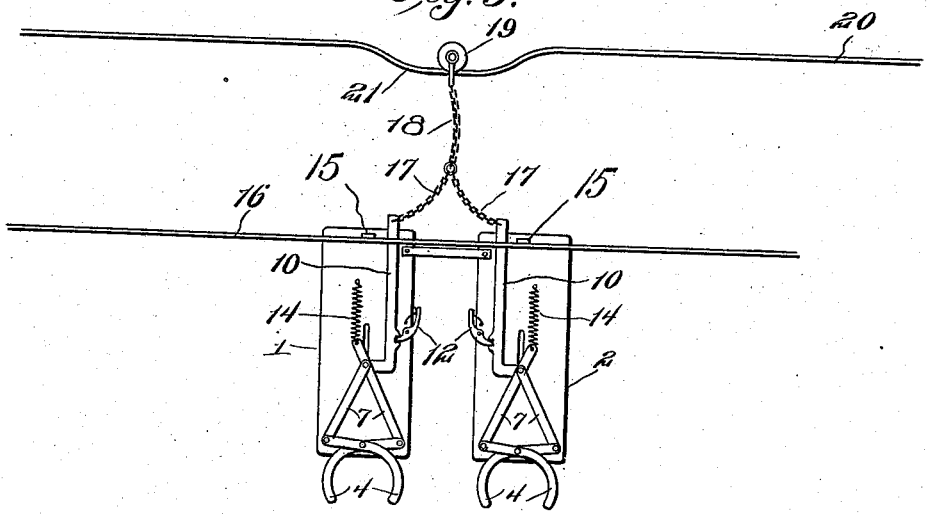
Witnesses
Inventor
Warren D. Farrell
By Victor J. Evans
Attorney

UNITED STATES PATENT OFFICE.

WARREN D. FARRELL, OF OTTUMWA, IOWA.

HOG GRAPPLE AND CONVEYER.

No. 899,391.  Specification of Letters Patent.  Patented Sept. 22, 1908.

Application filed May 15, 1908. Serial No. 433,059.

*To all whom it may concern:*

Be it known that I, WARREN D. FARRELL, a citizen of the United States, residing at Ottumwa, in the county of Wapello and State of Iowa, have invented new and useful Improvements in Hog Grapples and Conveyers, of which the following is a specification.

This invention relates to a hog grapple and conveyer for use in abattoirs, packing houses, etc., for grappling, suspending and transporting stock, the object of the invention being to provide a novel, simple and effective construction of device of this character whereby the animal may not only be suspended by both legs, but in which provision is made to secure the free manipulation of the device to suspend the hog, as well as to release the same without injury to the ham bones of the animal.

With these and other objects in view, the invention consists of the features of construction, combination and arrangement of parts hereinafter fully described and claimed, reference being had to the accompanying drawing, in which:—

Figure 1 is a front view of a grapple and conveyer embodying my invention, showing the grapple hooks open. Fig. 2 is a similar view of one of the sections of the device, showing the grapple hooks thereon closed. Fig. 3 is an elevation showing the tracks on which the device is adapted to be transported and supported, the device being illustrated as arranged at that point in the tracks to automatically release the animal.

Referring to the drawing, the letter A designates a supporting frame or carriage, comprising a pair of frame sections 2 and 3, preferably consisting of boards or plates pivotally connected at their upper ends by a link strap 3, on which the lower ends of said sections are adapted to swing toward and from one another to permit of an effective relative adjustment of the grapples. The grappling mechanism upon each frame section is similar in construction, each consisting of a pair of hooks 4 having cross arms 5 pivotally connected, as at 6, and to which are pivotally connected the lower ends of diverging links 7. The links are pivotally connected at their upper ends, as at 8, to the laterally projecting lower end 9 of a vertical suspending bar 10, which projects at its upper end above the upper end of the frame section and is provided adjacent its lower end at one side with a locking recess 11 adapted to be engaged by a spring-actuated latch 12, whereby the bar may be retained in a downwardly projected position to hold the grappling jaws or hooks open. The pivot pin is in the form of a pin or bolt which passes through the links and the arm 9 of the bar 10 and also through a vertical guide slot 13 in the frame section, thus mounting the parts for sliding motion on the frame section in a true path. The upper end of one of the links is extended beyond the pivot 8, as at 7ª, and connected with the frame sections by a contractile spring 14 adapted to draw upward on said links and to elevate the bar, and thereby automatically close the grappling jaws or hooks 4, which action is prevented when the bar is lowered by the engagement of the latch 12 with the recess 11. Each carriage section 1 and 2 is provided at its upper end with a supporting lug 15, by which the device may be supported from a suspending bar or rail 16 located at the discharge or destination point, and the upper ends of the suspending bars 10 of the two frame sections are connected by chain sections 17 with a hanger or suspension device 18 which may embody an ordinary suspension chain depending from a wheeled hanger 19 adapted to run upon an elevated track rail 20, which may be provided at each discharge point with a depression 21, said rail being arranged above the lower supporting bar or rail 16.

It will be understood that the grapples are controlled by the bars 10 and springs 14, and that when the bars are drawn downward and engaged by the latches the grapples will be held open, while upon the release of said latches the springs will draw the bars and links upward and thus close the grapples. It will be further understood that the pivotal connection 3 between the carriage or frame sections permits of a relative movement of the lower ends of said frame sections to adapt the sets of grapples to be readily engaged with the hind legs of large or small animals. It will thus be obvious that with the grapples locked by the latches in open position a live animal may be grappled by bringing the hind legs thereof in position to be engaged by the grappling hooks and then releasing the latches to cause said hooks to automatically close about the legs. The animal may thereupon be hoisted and killed and transported along the track 20 to the destination point, such as a scalding tank. During the period of transportation the bars 10 will be directly suspended by the hanger from the track and maintained at the limit of their upward movement, whereby said hooks will be held closed. When the carriage reaches the discharge point and the roller 19 drops into the depression 21 in the rail at such point, and the suspension device 18 sags, it will be understood that the carriage will drop down until the lugs 15 rest upon the supporting rail 16, whereupon the weight of the animal will cause a downward sliding movement of the parts of the grapples against the resistance of the springs 14, by which the grapples will be automatically opened and the animal released.

From the foregoing description, it will be apparent that the invention provides a type of grapple which may be readily and easily applied to support the animal without injury thereto, to transport the same from place to place or to suspend it at will, and to effect the ready release of the suspended animal at the expenditure of a minimum amount of time and labor.

Having thus fully described the invention, what is claimed as new is:—

1. A hog grappling and suspending apparatus comprising a board, jaws pivotally mounted upon the lower end of the board and provided with arms, a pivot member slidably engaging the board, links connected with the arms of the jaws and said pivot member, a suspending bar slidably connected with the board through said pivot member, a spring connected with one of said parts and the board for normally holding the parts in jaw closing position, a lock device engaging the bar to normally hold the parts in jaw opening position, a suspending device connected with the upper end of the bar, and a supporting projection upon the upper end of the plate for supporting the grapple independent of said suspending device.

2. A hog grappling and suspending apparatus, comprising a pair of frame sections pivotally connected at their upper ends, pivoted grappling hooks upon the frame sections, suspending bars pivotally connected with the grappling hooks, springs upon the frame sections and connected with the parts thereon for automatically closing the hooks, latches adapted to be engaged with said bars to hold the hooks open, supporting lugs upon the frame sections, and a flexible suspension device connected with the upper ends of the bars and connected with a wheeled traveler adapted to run upon a supporting rail.

3. A hog grappling and suspending device comprising a pair of boards, a link pivotally connecting the upper ends of the boards, sets of jaws pivotally mounted upon the lower ends of the boards, controlling links connected with the jaws, suspending bars pivotally connected with the links of each set of jaws, and slidably connected with the boards, a spring acting upon the bars and links of each board for moving the parts to jaw closing position, a latch device upon each board to engage the bar and maintain the hooks in jaw opening position, a suspending device connected to the upper ends of both suspending bars, and lugs upon the upper ends of the bars for supporting the device independent of said suspending device.

4. In a hog grappling and suspending apparatus, the combination of a track rail provided with a depressed portion, a supporting rail disposed below said track rail, a grapple comprising a board or plate, grappling jaws pivotally mounted thereon, a suspending bar pivotally and slidably connected with said jaws, spring means for moving the parts to jaw closing position, a locking device for holding the parts in jaw opening position, a suspending device connected with the bar and having a roller to travel on the track rail and lugs upon the upper end of the board or plate adapted to rest upon the track rail and to be engaged with and disengaged therefrom by a relative lateral movement of the board.

In testimony whereof I affix my signature in presence of two witnesses.

WARREN D. FARRELL.

Witnesses:
JOHN LEURS,
JAY T. FARRELL.